(12) United States Patent
Farmer

(10) Patent No.: US 8,086,424 B2
(45) Date of Patent: Dec. 27, 2011

(54) METHOD FOR DETERMINING LIFE OF FILTERS IN BAG HOUSE

(75) Inventor: Terry Lewis Farmer, Kearney, MO (US)

(73) Assignee: General Electric Company, Schenectady, NY (US)

(*) Notice: Subject to any disclaimer, the term of this patent is extended or adjusted under 35 U.S.C. 154(b) by 707 days.

(21) Appl. No.: 12/171,891

(22) Filed: Jul. 11, 2008

(65) Prior Publication Data

US 2010/0010777 A1      Jan. 14, 2010

(51) Int. Cl.
*G21C 17/00* (2006.01)
(52) U.S. Cl. .............. 702/184; 702/34; 702/45; 702/50; 702/81; 702/100
(58) Field of Classification Search ............ 702/34, 702/35, 45, 50, 81, 86, 98–100, 138, 176, 702/184; 116/DIG. 42
See application file for complete search history.

(56) References Cited

U.S. PATENT DOCUMENTS

| | | | | |
|---|---|---|---|---|
| 4,583,859 A | * | 4/1986 | Hall, II | 356/438 |
| 5,036,698 A | * | 8/1991 | Conti | 73/38 |
| 5,837,017 A | * | 11/1998 | Santschi et al. | 55/302 |
| 2003/0226809 A1 | * | 12/2003 | Zagone et al. | 210/741 |
| 2004/0079686 A1 | | 4/2004 | Moscaritolo et al. | |

FOREIGN PATENT DOCUMENTS

| | | |
|---|---|---|
| EP | 1 048 336 A1 | 11/2000 |
| GB | 2 323 310 | 9/1998 |

OTHER PUBLICATIONS

Great Britain Search Report for GB 0910940.6 mailed Dec. 4, 2009.

* cited by examiner

*Primary Examiner* — Mohamed Charioui
*Assistant Examiner* — Elias Desta
(74) *Attorney, Agent, or Firm* — Nixon & Vanderhye P.C.

(57) ABSTRACT

A method for dynamically determining a remaining actual operational period for a filter in a filtration device including: determining an initial remaining operational period based on an installation date of the filter and an initial expected operational period; periodically determining a remaining actual operational period of the filter based on the initial remaining operational period based and an elapsed operational period from the installation date; monitoring at least one operating parameter in the filtration device; adjusting the remaining actual operational period based on the monitored operating parameter, and continuing to periodically determine the remaining actual operational period based on the adjusted remaining actual operational period and the elapsed operational period.

13 Claims, 2 Drawing Sheets

METHOD FOR DETERMINING LIFE OF FILTERS IN BAG HOUSE

BACKGROUND OF THE INVENTION

The present invention relates to a bag house for filtering dust and other particles from a gaseous exhaust from, for example, a combustion system. Specifically, the present invention is related to control and monitoring systems for a bag house.

Bag houses filter dust and other gas borne particles from exhaust gas, such as flue gases from combustion systems. A bag house typically has an array of filter bags. The bag house ducts exhaust through the filter bags. As gas passes through the filter bags, dust and other particles are captured on the surfaces of the media of the filter bags. The buildup of dust and particles on the filter bags continues as the bag house filters dust from the exhaust air.

The buildup of dust and particles on the filter bags eventually clogs the porous media of the filter bags and obstructs the flow of exhaust gas through the bag house. Mechanisms are employed to remove the buildup from bag filter, such as agitators that shake the bags to cause the dust and particles to fall off the bags. In addition or as an alternative to, the bag filters may be cleaned by pulse jets that pulse air jets to the interior of the bag to apply an impulse to the bag that knocks off the dust and particles. However, these mechanisms do not entirely open the porous openings in the media of the bag filters. Even with periodic cleaning operations, the bag filters become clogged and unsuitable after prolonged use in a bag house.

Bag filters are conventionally assigned an operational life by the manufacturer of the bag. The operator of the bag house replaces the filter bags before they reach the end of their operational life. The assigned operational life of a bag filter is conventionally a fixed period. The assigned operational life may be assigned by bag filter manufacturer and is based, in part, on the type of bag house into which the filter is to be used.

The assigned operational life is based on assumptions of the operating conditions in the bag house. The operating conditions in a bag house may vary depending on ambient conditions, the composition of the mixture of exhaust gas, dust and other particles passing through the bag house and other factors. These variations in operating conditions affect the actual operational life of the bag filters. The assigned operational life does not vary and thus does not account for variations in the actual operation life of a bag filter. At the expiration of the assigned operational life, the bag filter is typically replaced regardless of whether there is remaining actual operating life of the filter. Bag filters having an expired actual operating life may remain in use in a bag house because the assigned operational life of the filter. Similarly, bag filters having an expired actual operating life may remain in use in a bag house because the assigned operational life of the filter has not expired.

BRIEF DESCRIPTION OF THE INVENTION

A method has been developed for dynamically determining a remaining actual operational period for a filter in a filtration device including: determining an initial remaining operational period based on an installation date of the filter and an initial expected operational period; periodically determining a remaining actual operational period of the filter based on the initial remaining operational period based and an elapsed operational period from the installation date; monitoring at least one operating parameter in the filtration device; adjusting the remaining actual operational period based on the monitored operating parameter, and continuing to periodically determine the remaining actual operational period based on the adjusted remaining actual operational period and the elapsed operational period.

A method has been developed for dynamically determining a remaining operational period for a bag filter in a bag house comprising: determining an initial remaining operational period based on an installation date of the bag filter and an initial expected operational period; periodically determining a remaining operational period of the bag filter based on the initial remaining operational period based and an elapsed operational period from the installation date; monitoring at least one operating parameter in the bag house; adjusting the remaining operation period based on the monitored operating parameter, and continuing to periodically determine the remaining operational period based on the adjusted remaining operation period and the elapsed operational period.

A method for dynamically determining a remaining operational life a bag filter in a bag house having a controller, the method comprising: entering into the controller bag filter data and an installation date of the bag filter in the bag house; determining an initial bag filter life based on the bag filter data; decrementing the initial bag filter life to determine a remaining bag filter life and periodically decrementing the remaining bag filter life; monitoring a bag house operating condition, wherein the operating condition is at least one of temperature of an inlet gas flow to the bag house, a pressure differential across the bag filter and particulate level in a outlet gas flow from the bag house; adjusting the remaining bag filter life based on the monitored bag house operating condition and periodically decrementing the remaining bag filter life, and replacing the bag filter at a time based on the decremented, adjusted remaining operational period.

An apparatus has been developed for dynamically determining a remaining operational life a bag filter in a bag house comprising: electronic storage containing data including an installation date of the bag filter, and data sufficient to determine an initial bag filter life; sensors monitoring a bag house operational condition which is at least one of temperature of an inlet gas flow to the bag house, a pressure differential across the bag filter and a particulate level in a outlet gas flow from the bag house; a computer controller including an executable program which counts down the bag filter life by decrementing the life based an operational period of the bag house to determine a remaining bag filter life and adjusts the remaining bag filter life based on the monitored bag house operational condition, and a user terminal indicating the remaining bag filter life.

As an example, a sensor may be an exhaust gas opacity sensor in the outlet gas flow from the device, and the executable program adjusts the remaining filter life to reduce a difference between a sensed level exhaust gas opacity provided by the opacity sensor and expected opacity level. The expected opacity level is determined by the controller based on opacity data, such as a lookup table which correlates various periods of expected remaining life to various opacity levels. The opacity data is stored in the electronic storage correlating the expected opacity level to an operational period of the filter.

DETAILED DESCRIPTION OF THE INVENTION

Figure 1:
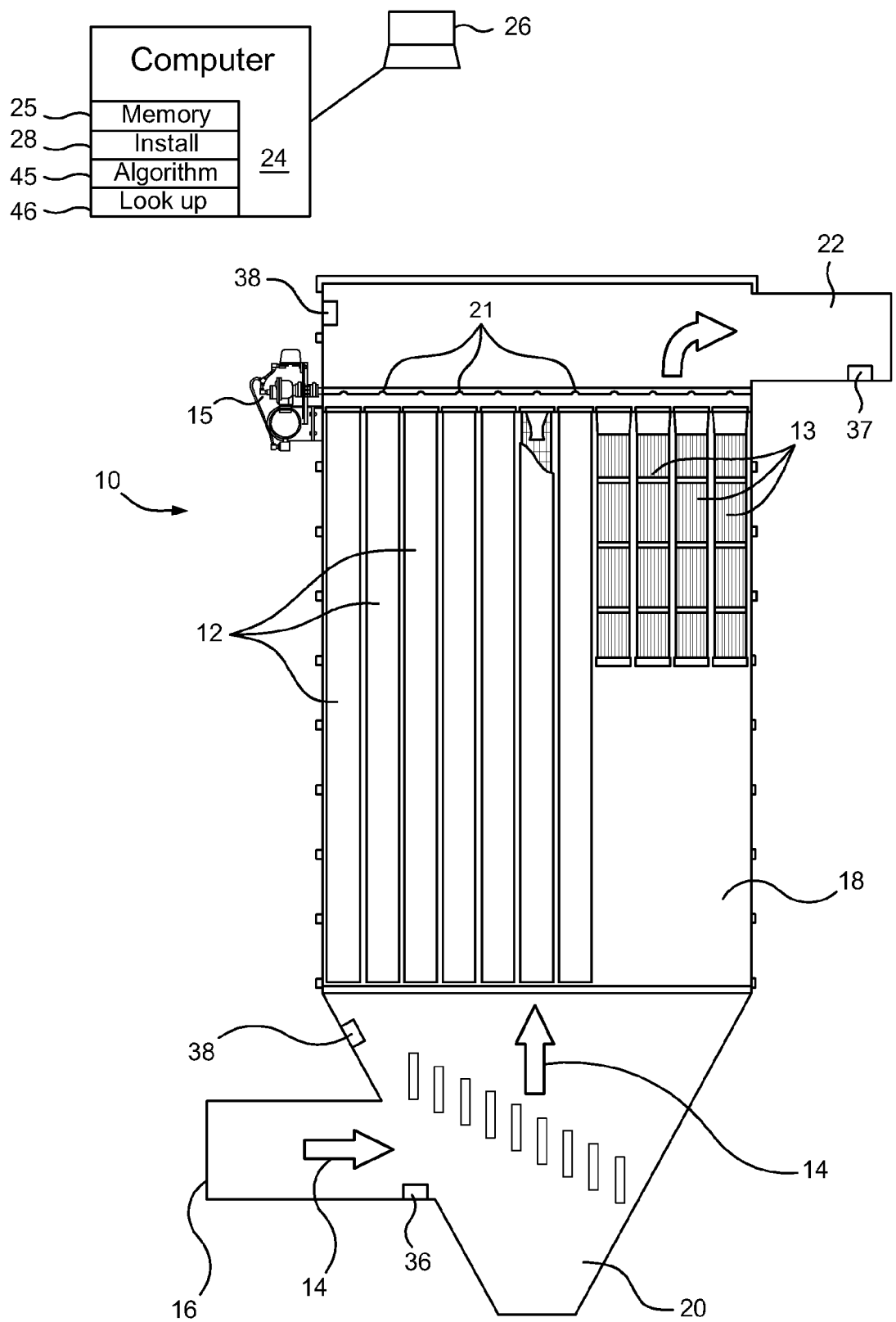
FIG. 1 is a schematic view of a bag house showing the internal bag filters, the flow of exhaust gases and dust through the filters and a control system for the bag house.
Figure 2:
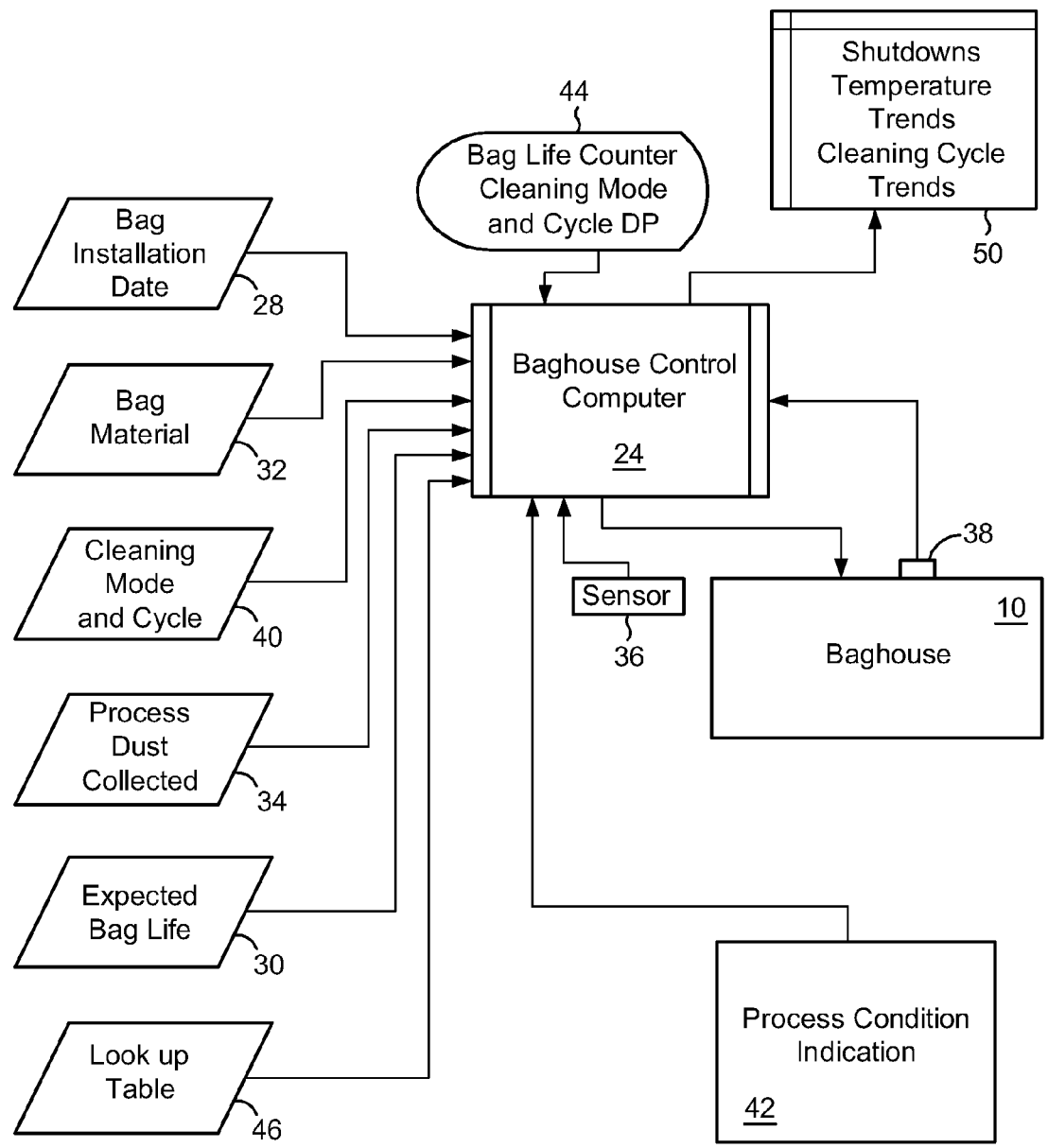
FIG. 2 is a flow chart for control method executed by the control system for dynamically determining the operational life of the bag filters.

FIG. 1 is a schematic view of a bag house 10 having internal bag filters 12. Exhaust gas 14 enters an inlet 16 to the bag house and is ducted through the bag filters. The exhaust gas enters a lower portion of the bag house and passes upward to the array of bag filters 12 hanging from the top of an interior chamber 18 of the bag house. Dust and particles collect and buildup on the outer surfaces of the bag filters. A bin 20 at the bottom of the chamber 18 collects the dust and particles that fall from the filter bags. The bags are periodically shaken by agitators 21, e.g., to remove the dust and particles from the filters.

Exhaust gas passes into the bag filters and enter an exhaust duct 22 downstream of the filters. The exhaust gas, without the dust and particles, is exhausted from the bag house to the atmosphere or to further pollution control systems.

A computer controller 24 monitors the operating conditions of the bag house 10. The computer controller includes a computer system having electronic storage having an executable program for monitoring the bag house and dynamically determining the operational life of the bag filters.

A user interface 26 includes an input terminal through which data is entered to the controller by operators of the bag house. The user interface also includes a display or other output device to provide data regarding the operational life of the filter bags to the users. The data input to the terminal by the operator may include installation date of the bag filters 28, the assigned expected operational life of the bag filters 30, the bag material of the bag filters in the bag house 32, and the type 34, e.g., coal combustion particles, or composition of the dust and particles that are deposited on the bag filters. This data is used by the controller 24 and its program in dynamically determining the remaining life of the bag filters in the bag house.

Sensors in the bag house collect data regarding the operation condition of the bag house. The sensors preferably includes a temperature sensor 36 determining the temperature of the exhaust gas entering the bag house, a particulate sensor 37, e.g., an opacity sensor, detecting a dust/particulate level in the exhaust of the bag house, and a differential pressure sensor 38 in the bag house, such as the pressure difference between the exhaust gas inlet and outlet of the bag house. The pressure differential indicates the amount of dust and particle buildup on the bag filters.

Further, the pressure differential at a time promptly after the bags are agitated or pulsed with air indicates the pressure drop as the exhaust gas flows through the bags after the dust and particle deposits have been shaken off the bas. This pressure differential indicates the continued ability of the bags to filter out dust and particles without excessive pressure losses through the bag house.

To remove dust and particles from the bag filters the controller periodically executes a cleaning mode program 40 which determines when to agitate or pulse the bag filters. In addition, the cleaning mode program 40 identifies when the bags have been agitated and thereafter prompts a differential temperature measurement to determine the pressure drop through the bag house attributable to the filter bags with minimal dust and particle buildup on the bags. The pressure differential data (which may be an analog signal from the pressure sensors) is stored in the bag house control system 24.

The bag house controller 24 may collect and store data regarding other process conditions in the bag house and, optionally, in the combustion system or other gas generation system to which the bag house is attached. Data regarding the process conditions are provided by a process condition indication system 42. This system may, for example, detect when the gas generation system turns ON and OFF, when the gas generation system changes process conditions, and when the gas generation system inadvertently exhausts combustible materials, such as unburned fuel oil.

The bag house controller 24 maintains counters 44 to track the remaining life of the bag filters and determine when to activate the agitators 21 to shake the dust and particles off of the bag filters. The counter for determining when to enter a cleaning mode may be based on cleaning cycle prescribed by the cleaning mode and cycle program 40. The counter for determining when the agitators are to be activated uses a cycle time from the cleaning mode and cycle program 40 and counts down until it is time to activate the cleaning mode.

The bag life counter 44 determines when to replace the bag filters by decrementing the remaining actual life of the filters. For example, the bag life counter 44 may initially set the bag life to be equal to the expected bag life 30 input by the operator. The counter counts down the time to replacement of the bag filters based on the operational time of the bag house. The counter 44 counts down the time to when the bag filters should be replaced and thereby tracks the remaining life of the bag filters.

The remaining actual life of the filters is determined based on the assigned operational life of the bag filter, the elapsed time, such as operational time, between the filter installation date and the current operational time, and adjustment one or more of filter life adjustments based on Accelerated Life Factors (ALF) that are applicable to the bag filters. The controller determines which of the ALFs are applicable. Based on the applicable ALFs, the controller determines an adjustment (s) to be made to remaining actual filter life. The determination of the applicable ALFs is based on input parameters, such as user inputs and sensor inputs, received by the controller. The controller 24 may adjust the remaining life of the bag filters based on operating conditions, such as the differential pressure (as measured by the pressure sensors 38) promptly after the bag filters are agitated, inlet temperature (as measured by the temperature sensor 38) to the bag house and other process conditions (see process condition indicator 42).

The program stored and executed by the controller 24 may include an algorithm 45 to dynamically determine the bag life. An exemplary algorithm is (Eq. 1) below:

$$BL = (\text{Assign } BL - \text{Elapsed Operating Time}) + \text{Accelerated Life Factors(ALF)}. \qquad \text{Eq. 1:}$$

Where, BL is remaining bag life; fabric material in a given process is considered in the base line Bag Life (BL). Temperature, pressure drop and cleaning frequency will drive the Accelerated Life Factors ALF. These factors will be driven based on the period of time that passes and the intensity of each.

The ALFs are one or more operating factors that affect, such as by accelerating the aging of the installed filter bags. Temperature exposure, high pressure drop across the filters, frequency of cleaning and the cleaning intensity are examples of ALFs. These exemplary ALFs each independently accelerate the aging of the filters. The ALFs tend to be application and filter media dependent. In other words, the specific effect that each ALF has on the aging of the bag filter depends on the bag house application and the media used to form the filter. An adjustment factor for each of these specific ALFs is stored in the lookup table 46. The adjustment factor may be dependent on the ALF, the bag house application and the media of the bag filter.

The controller determines which ALFs affect the bag house based on sensor and user inputs. The controller selects the adjustment factor(s) that correspond to the ALFs that influence the actual operational life of the bag filters. The lookup table 46 correlates input and sensor data to an appropriate adjustment factor for each of the ALFs. To determine the appropriate adjustment factor from the lookup table, the controller would input to the lookup table one or more of the selected ALFs, the bag house application, the filter bag media and data obtained from the sensors. The outputted adjustment factors are applied by the algorithm and controller to determine an adjusted actual operational life of the filters. The controller adjustment factors outputted by the lookup table indicate a period(s) of time to be added or subtracted from the actual operating life of the filters.

The above algorithm, i.e., Equation 1, or other algorithm that accounts for the effects on bag life of at least one of bag house inlet temperature, bag house differential pressure or another process condition provides a means for the controller 24 to dynamically adjust the remaining bag life count down. Specifically, the bag life counter 44 is initialized with the installation date of the bag filters and at least one of the assigned operational life of the bag filters, the make and model of the bag filters or the material of the bag filters.

The controller may access the electronic lookup table 46 stored in memory to determine the initial expected bag life, e.g., in days or weeks, of the bag filters. The controller initializes the bag life counter 44 based on the initial expected bag life and the installation date of the bag filter 28. The bag life counter begins to count down the remaining life of the bag filters based on the operating time of the bag house. For example, the bag life counter may decrement by one day the remaining life of the bag filters based on each 24-hour operation of the bag house. The remaining bag life may be displayed on the user interface.

The bag life counter and controller may adjust the remaining bag life based on operational conditions of the bag house and other parameters, such as ambient conditions and process conditions in the combustion system upstream of the bag house.

For example, the controller may apply the algorithm (Eq. 1) to increase or decrease the remaining bag life based on:

(i) the inlet temperature to the bag house being above or below (Temp. Delta) an expected or baseline inlet temperature (for example an inlet temperature at least 10 degrees Celsius above a baseline temperature may decrease the remaining bag life by one day for each period of 12 hours that the inlet temperature is the high level).

(ii) the pressure differential across the bag house inlet and exhaust being greater or less than an expected or baseline pressure differential (especially if the differential is determined promptly after a bag filter cleaning process. For example, if the pressure differential is greater than 20 percent of a base line pressure value for a period of two hours after a bag cleaning operation, the remaining bag life may be decremented by two weeks).

(iii) the particulate level in the bag house exhaust is above or below a base line level (for example, days are added or subtracted from the remaining bag life to minimize a delta between the actual particulate level in the bag house exhaust and a baseline particulate level, where the baseline is a function, e.g., linear function, of remaining bag life). Alternatively, the electronic memory in the computer controller may store a lookup table which correlates various periods of expected remaining bag life to various opacity levels, and the lookup table is used to adjust the remaining bag life based, and (iv) the delta between an actual process condition and a base line condition over a period of time is applied to increase or decrease the remaining bag life (such as an actual moisture level in the inlet gas (see inlet 16) more than 20 percent above a baseline moisture level decreases the bag life by a day for each 24 hour period that the actual moisture level continues at such a high level).

These factors (i) to (iv) are applied by the controller to dynamically adjust the remaining bag life as determined by the bag life counter. The counter continues to count down the remaining bag life and display the remaining life on the user interface. The counter may trigger the controller to send messages and alarms to the user interface as the remaining bag life decrements past certain periods, such as two months remaining of life, 2 weeks remaining of life, and bag life expired. The bag filters are preferably replaced at the expiration of the bag life period.

The user interface may also report data collected from the operation of the bag house, such as data 50 showing temperature trends in the bag house, shutdowns of the bag house and in cleaning cycles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method to determine an operational period for a filter in a filtration device comprising:
    determining an initial remaining operational period based on an installation date of the filter and an initial expected operational period, wherein the initial expected operational period is determined before the filter starts filtration;
    periodically calculating a remaining actual operational period of the filter based on the remaining operational period based and an elapsed operational period of the filtration;
    monitoring an opacity of gases through the filter, and
    periodically adjusting the calculated remaining actual operational period based on the monitored opacity.

2. The method of claim 1 wherein the filtration device is a bag house and the filter is an array of bag filters, and further comprising replacing the bag filters at or before the expiration of the adjusted remaining actual operational period.

3. The method of claim 1 wherein the operational period is a filter life.

4. A method for dynamically determining a remaining actual operational life a bag filter in a bag house having a controller, the method comprising:
    entering into the controller bag filter data and an installation date of the bag filter in the bag house;
    determining an initial bag filter life based on the bag filter data;
    decrementing the initial bag filter life to determine a remaining actual bag filter life and periodically decrementing the remaining actual bag filter life;
    monitoring a bag house operating condition, wherein the operating condition includes the opacity of a gas having passed through the bag filter;

adjusting the remaining actual bag filter life based on the monitored bag house operating condition and periodically decrementing the remaining actual bag filter life, and replacing the bag filter at a time based on the decremented, adjusted remaining actual bag filter life.

5. The method of claim 4 wherein bag house operating condition is the pressure differential and the pressure differential is determined promptly after a bag filter cleaning operation.

6. The method of claim 4 wherein the bag house operating condition is the particulate level and the method further comprises:

determining a difference between the particulate level and a baseline particulate level, wherein the baseline particulate level is a function of remaining bag life, and adjusting the remaining bag life to reduce the difference.

7. The method of claim 4 wherein the remaining actual bag life is displayed on a user terminal in communication with the controller.

8. An apparatus for dynamically determining a remaining actual operational life of a filter in a filtration device, comprising:

a non-transitory electronic storage containing data including an installation date of the filter, and data indicating an initial filter life;

a sensor monitoring a particulate level in an outlet gas flow from the filtration device, and the sensor includes an exhaust gas opacity sensor in the outlet gas flow from the filtration device;

a computer controller including an executable program stored on the electronic storage, wherein the execution of the program causes the controller to determine a remaining actual operational filter life based on a difference between a sensed level exhaust gas opacity provided by the opacity sensor and an expected opacity level, wherein the expected opacity level is determined by the controller based on opacity data stored in the electronic storage correlating the expected opacity level to an operational period of the filter, and a user terminal indicating the remaining actual filter life.

9. The apparatus as in claim 8 further comprising a filter cleaning device coupled to the filter and the executable program periodically commands the filter cleaning devices to remove dust and particles from the filter.

10. The apparatus as in claim 8 wherein the filtration device is a bag house and the filter is at least one bag filter.

11. The apparatus as in claim 8 wherein the opacity data is a lookup table which correlates various periods of expected remaining life to various opacity levels.

12. The apparatus as in claim 8 wherein the wherein the filter is an array of bag filters arranged in the device.

13. The apparatus as in claim 8 wherein the filter is a porous material.

* * * * *